US 12,099,538 B2

(12) United States Patent
Chew (10) Patent No.: US 12,099,538 B2
(45) Date of Patent: Sep. 24, 2024

(54) IDENTIFYING FRINGE BELIEFS FROM TEXT

(71) Applicant: Peter A. Chew, Albuquerque, NM (US)

(72) Inventor: Peter A. Chew, Albuquerque, NM (US)

(73) Assignee: Galisteo Consulting Group, Inc., Albuquerque, NM (US)

(*) Notice: Subject to any disclaimer, the term of this patent is extended or adjusted under 35 U.S.C. 154(b) by 227 days.

(21) Appl. No.: 17/514,283

(22) Filed: Oct. 29, 2021

(65) Prior Publication Data

US 2023/0136726 A1 May 4, 2023

(51) Int. Cl.
*G06F 40/00* (2020.01)
*G06F 16/35* (2019.01)
(Continued)

(52) U.S. Cl.
CPC ............ *G06F 16/35* (2019.01); *G06F 18/231* (2023.01); *G06F 40/284* (2020.01); *G06V 30/416* (2022.01); *G06F 2218/00* (2023.01)

(58) Field of Classification Search
CPC ...... G06F 16/35; G06F 18/231; G06F 40/284; G06F 11/30; G06F 16/30; G06F 16/313; G06F 16/31; G06F 16/3329; G06F 16/355; G06F 16/358; G06F 16/367; G06F 40/279; G06F 40/295; G06F 40/289; G06F 40/10; G06F 40/20; G06F 40/30; G06F 18/217; G06F 16/273; G06F 18/24; G06N 3/08; G06N 5/048; G06N 3/0985; G06N 20/10; G06N 20/20; G06N 20/00; G06N 5/01;
(Continued)

(56) References Cited

U.S. PATENT DOCUMENTS 6,598,047 B1 * 7/2003 Russell .................. G06F 16/30
707/999.005
6,847,966 B1 * 1/2005 Sommer ............. G06F 16/3347
707/999.005
(Continued)

OTHER PUBLICATIONS

Raza, Mohammad, and Sumit Gulwani. "Automated data extraction using predictive program synthesis." Proceedings of the AAAI Conference on Artificial Intelligence. Vol. 31. No. 1. Feb. 12, 2017. (Year: 2017).*
(Continued)

*Primary Examiner* — Edgar X Guerra-Erazo (57) ABSTRACT

Disclosed is a flexible, scalable method for automatically distinguishing between the 'mainstream' and 'fringe' in any text dataset, such as unstructured social media data. The disclosed method allows analysts quickly to pinpoint text articulating fringe beliefs or theories, without prior knowledge of the nature of the fringe beliefs, and can be applied to text data in any language, provided the data can be represented electronically. The method works automatically and without any preconceived notions of what is important or what vocabulary is used in the context of certain beliefs. An analyst's attention is then quickly focused either on new conspiracy theories taking hold (potentially allowing decision-makers to act to interdict the 'next QAnon insurrection'), or on well-founded beliefs that simply are not yet mainstream. Either way, analysts are empowered better to 'connect the dots' for a more complete understanding of the information environment.

18 Claims, 5 Drawing Sheets

SAMPLE OUTPUT INCLUDES:
- DENDROGRAM(S) REPRESENTING HIERARCHICAL CLUSTERING
- HEATMAP ALLOWING INTER-TEXT SIMILARITIES AND DIFFERENCES TO BE QUICKLY VISUALIZED

PART OF OUTPUT Together, the heatmap and dendrogram allow anomalous clusters to be identified, allowing the analyst to distinguish between the vast mass of the 'mainstream' versus the anomalies of the 'fringe' – all based solely on the words in each text.

(51) Int. Cl.
*G06F 18/231* (2023.01)
*G06F 40/284* (2020.01)
*G06V 30/416* (2022.01)

(58) Field of Classification Search
CPC .......... G06N 5/00; G06N 3/092; G06N 3/098;
G06N 3/096; G06N 3/09; G06N 3/091;
G06N 3/0895; G06N 3/086; G06N 3/082
See application file for complete search history.

(56) References Cited

U.S. PATENT DOCUMENTS

| | | | | |
|---|---|---|---|---|
| 9,015,082 B1* | 4/2015 | Jaiswal | ............... | G06F 21/6227 |
| | | | | 706/12 |
| 9,201,971 B1* | 12/2015 | Jakubik | ................ | G06F 16/335 |
| 9,311,391 B2* | 4/2016 | Lepsoy | ................ | G06Q 30/02 |
| 9,715,495 B1* | 7/2017 | Tacchi | ................ | G06F 40/30 |
| 9,836,183 B1* | 12/2017 | Love | ................ | G06F 16/904 |
| 10,140,289 B2* | 11/2018 | Chew | ................ | G06Q 50/01 |
| 10,224,119 B1* | 3/2019 | Heinrich | ................ | G16H 50/70 |
| 10,666,792 B1* | 5/2020 | Marzuoli | ................ | H04M 3/436 |
| 11,120,226 B1* | 9/2021 | Nudd | ................ | G06F 40/30 |
| 11,157,503 B2* | 10/2021 | Kim | ................ | G06F 16/248 |
| 11,631,401 B1* | 4/2023 | Nudd | ................ | G10L 15/16 |
| | | | | 704/9 |
| 11,645,319 B1* | 5/2023 | Krusell | ................ | G06F 16/35 |
| | | | | 707/748 |
| 11,763,198 B2* | 9/2023 | Niculescu-Mizil | ................ | |
| | | | | G06F 18/2433 |
| | | | | 382/225 |
| 11,789,592 B1* | 10/2023 | Fehlman, II | ............ | G06F 16/34 |
| | | | | 715/738 |
| 2002/0165884 A1* | 11/2002 | Kreulen | ................ | G06F 16/93 |
| | | | | 707/E17.008 |
| 2005/0278293 A1* | 12/2005 | Imaichi | ................ | G06F 16/93 |
| 2006/0235870 A1* | 10/2006 | Musgrove | ................ | G06F 40/30 |
| | | | | 707/999.102 |
| 2007/0050356 A1* | 3/2007 | Amadio | ................ | G06F 16/334 |
| | | | | 707/999.005 |
| 2007/0124299 A1* | 5/2007 | Martin | ................ | G06F 16/31 |
| | | | | 707/999.005 |
| 2009/0132901 A1* | 5/2009 | Zhu | ................ | G06F 16/951 |
| | | | | 715/206 |
| 2010/0114890 A1* | 5/2010 | Hagar | ................ | G06F 16/36 |
| | | | | 707/E17.014 |
| 2011/0093452 A1* | 4/2011 | Jain | ................ | G06F 16/3322 |
| | | | | 707/723 |
| 2011/0219000 A1* | 9/2011 | Kusumura | .......... | G06F 16/3346 |
| | | | | 707/750 |
| 2011/0295903 A1* | 12/2011 | Chen | ................ | G06F 16/285 |
| | | | | 707/794 |
| 2012/0030159 A1* | 2/2012 | Pilaszy | ................ | G06Q 10/00 |
| | | | | 706/46 |
| 2014/0236943 A1* | 8/2014 | Li | ................ | G06F 16/3344 |
| | | | | 707/736 |
| 2014/0304197 A1* | 10/2014 | Jaiswal | ............... | G06F 21/6209 |
| | | | | 706/12 |
| 2015/0066939 A1* | 3/2015 | Misra | ................ | G06F 16/355 |
| | | | | 707/739 |
| 2015/0378986 A1* | 12/2015 | Amin | ................ | G06F 40/30 |
| | | | | 704/9 |
| 2016/0203209 A1* | 7/2016 | Clinchant | ............ | G06F 16/353 |
| | | | | 707/738 |
| 2017/0083510 A1* | 3/2017 | Dixon | ................ | G06F 40/44 |
| 2018/0144214 A1* | 5/2018 | Hsieh | ................ | G06T 7/0002 |
| 2018/0285342 A1* | 10/2018 | Chew | ................ | G06F 16/93 |
| 2019/0147062 A1* | 5/2019 | Kim | ................ | H04N 21/4532 |
| | | | | 707/748 |
| 2020/0004882 A1* | 1/2020 | Kulkarni | ................ | G06F 17/18 |
| 2020/0356851 A1* | 11/2020 | Li | ................ | G06F 16/93 |
| 2021/0026921 A1* | 1/2021 | Mutalikdesai | ...... | G06F 18/2411 |
| 2021/0089959 A1* | 3/2021 | Ghosh | ................ | G06N 5/01 |
| 2021/0141822 A1* | 5/2021 | McLeod | ................ | G06F 16/93 |
| 2021/0295101 A1* | 9/2021 | Tang | ................ | G06V 30/412 |
| 2021/0334656 A1* | 10/2021 | Sjogren et al. | .......... | G06N 3/08 |
| 2021/0334908 A1* | 10/2021 | Shu | ................ | G06Q 50/01 |
| 2022/0058464 A1* | 2/2022 | Qiu | ................ | G06F 40/194 |
| 2022/0114340 A1* | 4/2022 | Graeser | ................ | G06N 3/045 |
| 2022/0114822 A1* | 4/2022 | Ma | ................ | G06V 30/274 |
| 2022/0156300 A1* | 5/2022 | Paruchuri | ............ | G06N 3/08 |
| 2022/0269939 A1* | 8/2022 | Zhao | ................ | G06F 40/30 |
| 2022/0277035 A1* | 9/2022 | Ghosh | ................ | G06N 20/00 |
| 2022/0318505 A1* | 10/2022 | Pouran Ben Veyseh | .................... | |
| | | | | G06F 40/126 |
| 2022/0405480 A1* | 12/2022 | Huang | ................ | G06F 40/166 |
| 2022/0414694 A1* | 12/2022 | Sokolovsky | .......... | G06F 40/279 |
| 2023/0004748 A1* | 1/2023 | Rodriguez | ............ | G06F 18/213 |
| 2023/0101817 A1* | 3/2023 | Sinha | ................ | G06F 16/93 |
| | | | | 707/722 |
| 2023/0169271 A1* | 6/2023 | Shailabh | ................ | G06F 40/289 |
| | | | | 704/9 |
| 2023/0205938 A1* | 6/2023 | Stava | ................ | G06F 30/10 |
| | | | | 703/1 |
| 2023/0306046 A1* | 9/2023 | Omland | ................ | G06F 16/30 |
| 2023/0306766 A1* | 9/2023 | Rodriguez | ............ | G06V 20/62 |
| | | | | 382/181 |

OTHER PUBLICATIONS

Gligorijević, Vladimir, Yannis Panagakis, and Stefanos Zafeiriou. "Non-negative matrix factorizations for multiplex network analysis." IEEE transactions on pattern analysis and machine intelligence 41.4 (2018): 928-940. Jan. 25, 2017. (Year: 2017).*

Sakai, Ryo, et al. "dendsort: modular leaf ordering methods for dendrogram representations in R." F1000Research 3 (2014). (Year: 2014).*

Montell, Amanda. Cultish: The Language of Fanaticism. 2021. HarperCollins: New York, USA.

* cited by examiner

FIG. 1

INPUT

PART OF OUTPUT

FIG. 2

| Document # | Document Text |
|---|---|
| Document 1 | the man walked the dog |
| Document 2 | the man carried the dog to the park |
| Document 3 | the dog walks to the part |

Construction of matrix

| Term | Document 1 'the man walked the dog' | Document 2 'the man carried the dog to the park' | Document 3 'the dog walks to the park' | Total |
|---|---|---|---|---|
| the | 2 | 3 | 2 | 7 |
| man | 1 | 1 | 0 | 2 |
| walked | 1 | 0 | 0 | 1 |
| dog | 1 | 1 | 1 | 3 |
| carried | 0 | 1 | 0 | 1 |
| to | 0 | 1 | 1 | 2 |
| park | 0 | 1 | 1 | 2 |
| walks | 0 | 0 | 1 | 1 |
| Total | 5 | 8 | 6 | 19 |

FIG. 3

| Document n | Payment to Emanuel Bach 0034X078 Schreberstr. 14, 04109 Leipzig |

$$\log \frac{p(x,y)}{p(x)p(y)} = \log \frac{p(x\mid y)}{p(x)}$$

| Term | Count in document n | PMI Weight in document n |
|---|---|---|
| 0034X078 | 1 | 4.112 |
| Bach | 1 | 4.012 |
| schreberstr | 1 | 3.233 |
| emanuel | 1 | 3.011 |
| 4109 | 1 | 1.688 |
| leipzig | 1 | 1.381 |
| 14 | 1 | 0.072 |
| payment | 1 | 0.067 |
| to | 1 | 0.044 |

FIG. 4

SAMPLE OUTPUT INCLUDES:
- DENDROGRAM(S) REPRESENTING HIERARCHICAL CLUSTERING
- HEATMAP ALLOWING INTER-TEXT SIMILARITIES AND DIFFERENCES TO BE QUICKLY VISUALIZED

Together, the heatmap and dendrogram allow anomalous clusters to be identified, allowing the analyst to distinguish between the vast mass of the 'mainstream' versus the anomalies of the 'fringe' – all based solely on the words in each text.

FIG. 5

DETAILED FLOWCHART OF ENTIRE PROCESS (BEST MODE)

IDENTIFYING FRINGE BELIEFS FROM TEXT

STATEMENT REGARDING FEDERALLY SPONSORED RESEARCH

This invention was made with Government support under Contract No. N00014-21-P-2006 awarded by the Office of Naval Research to Galisteo Consulting Group, Inc. The U.S. Government has certain rights in this invention.

CROSS REFERENCE TO RELATED APPLICATIONS

This Application is a Continuation-in-Part (CIP) of U.S. patent application Ser. No. 15/472,697, filed Mar. 29, 2017, the contents of which are herein incorporated by reference.

BACKGROUND OF THE INVENTION

1. Field of the Invention

The present invention relates generally to natural language processing, and in particular to the application of language-independent topic modeling to unstructured text data (the input data). Without preconceptions as to what in a text corpus constitutes the mainstream versus the fringe (or anomalies), the invention uses properties of distinctive language use—characteristic in cults and other fringe communities, and based solely on statistics and co-occurrences of unusual clusters of words—automatically to highlight clusters of text to an analyst which are more likely to be representative of fringe ideas. The invention provides a 'social radar' to an analyst, quickly revealing areas of the information environment that may require closer attention— for example, potentially allowing the 'next QAnon insurrection' to be interdicted, or simply helping the analyst gain better situational awareness by distilling subtle and under-reported narratives from the 'wisdom of crowds'.

2. Description of the Prior Art

U.S. Patent Application Number 20210334908 describes a system and method for detecting fake news.

This system and method presupposes the existence of fact-checking websites as sources for collecting alleged fake news information. The above presupposition means that the invention disclosed in U.S. Patent Application Number 20210334908 does not cater for instances where independent fact-checking sources may not be available. The presupposition also means that the invention is not equipped to identify fringe beliefs that may be true and/or harmless, but not on the radar of investigators simply because they are not mainstream. Investigators often need to know about emerging fringe beliefs that have not yet been fact-checked, or which may even be true, and the invention disclosed in U.S. Patent Application Number 20210334908 does not address such cases.

U.S. Patent Application Number 20200004882 discloses techniques for providing misinformation detection in online content. These techniques incorporate machine and hybrid intelligence implementing both semantic analysis and syntactic analysis This system and method relies on techniques which would have to be language-specific (for example, designed to work with English), such as sentiment analysis; keywords indicating exaggeration or polarity such as 'the worst', 'loser', 'huge' or 'great'; capitalization (not all languages use capitalization and among those that do, not all use capitalization in the same way). The number of features proposed is large and would at a minimum require configuration by the user. Additionally, sentiment analysis is usually a supervised machine learning task, requiring the user to provide labeled data which may not always be available in every language. Additional problems with this system and method are the same as for that in U.S. Patent Application Number 20210334908: fringe beliefs are not always misinformation, and vice-versa. The analyst can benefit from the much simpler method that we disclose by not having to spend time configuring the system for different datasets, and often simply needs to know about anomalies in large datasets.

U.S. Patent Application Number 20210334656 discloses a technique for anomaly detection and can be used on data sources including text.

This system and method uses a deep neural network, and relies on the use of a training data set that includes possible observations that can be input to the deep neural network. The assumption is that a training data set of 'normal' behavior is available, which is, more often than not, not the case. Greater utility can be provided to a user if data is allowed to speak for itself as to what is anomalous versus normal behavior.

SUMMARY OF THE INVENTION

The present invention is a computer-implemented method for identifying fringe beliefs from electronic text such as global social media. Note that both 'fringe beliefs' and 'text' here are broadly defined (see Definitions under DETAILED DESCRIPTION OF THE INVENTION).

The key inspiration for this invention came from a non-obvious coupling of two seemingly unrelated concepts (see references): (1), unsupervised exfiltration event detection for anomalous network traffic, (2) the observation by Amanda Montell that cults predictably use idiosyncratic and anomalous vocabulary. The coupling of these concepts is non-obvious because Montell, without in any way referencing machine learning or the statistical properties of language, applies her insight only to currently known cults (such as Scientology) and without considering how language statistics or machine learning could be applied to her idea to generalize it to any text data to discover new, unknown cults or fringe beliefs. But an analyst trying to make sense of the information environment will want to know what the next emerging cult is, and without knowing in advance what specific vocabulary it will use. To apply Montell's insight to solve this problem and provide utility to such an analyst, unsupervised machine learning techniques must be set up in a specific way, outlined further under 'DETAILED DESCRIPTION OF THE INVENTION', to harness Montell's insight very generally, without introducing external biases, and producing actionable output.

The input to the invention is any dataset of interest, consisting of 'documents' (defined below) which can be represented electronically, for example social media posts. Up front, the user of the invention determines the dataset of interest. The output of the invention is collection of graphical representations of the dataset, ultimately constructed solely on the basis of the words in the documents and the co-occurrences of those words. Individually or in combination, the graphical representations quickly bring to the user's attention anomalous clusters within the dataset as a whole. 'Anomalousness' is determined based on documents in question somehow being different—even if subtly—from the mainstream within the data, something which would happen if these documents use ordinary words in unusual ways, as frequently happens in cults: an example from Scientology is the non-standard meanings assigned to words such as 'audit', 'tech', 'valence', or use of non-standard words, such as 'enturbulated'. The invention does not rely in any way on training data or specific vocabulary lists—everything comes from the statistics of the data—so it can be applied to text in any language. The analyst uses the output quickly to identify which documents are anomalous, essentially finding an 'unknown unknown' needle in a haystack, so these documents can be read and understood, and if needed, any action taken.

The following example will serve to illustrate the functioning of the invention and a use thereof. An investigator (the user) may know about QAnon and its connection to the Jan. 6, 2021 insurrection at the U.S. Capitol. But it is now October, 2021, and the investigator is concerned that other new and unknown conspiracy theories may lead to further undetermined violence. The investigator would also like to know of any fringe theories that have not been reported on, and may not be dangerous or false, but would actually help the investigator better to make sense the complex information environment. The investigator collects a dataset of 200,000 tweets (Twitter posts) on some general topic of interest to the investigator, say, 'climate change'. This dataset is fed into the invention by the investigator. The invention provides a collection of graphical outputs representing the input data. The investigator reviews the output as a radiologist might review an X-ray or CT (Computed Tomography) scan. From the output, the investigator can quickly see that 90% of the Twitter posts are, from the investigator's perspective, likely to be 'noise'—large-scale patterns in the tweets representing things (perspectives or narratives) the investigator is already likely to know about. It is also apparent that some clusters represent large numbers of identical tweets, which are also uninteresting to the investigator because it is common for some tweets to get widely retweeted. However, the investigator identifies in the output three small anomalous clusters, each consisting of 25-50 non-identical tweets. The investigator reviews these and finds that one of these clusters is in a foreign language, but on translating the tweets in it, the investigator decides it does not merit further analysis. The second and third clusters are in English and contain words the investigator does not recognize, and unusual combinations of words representing chains of thought the investigator has not previously encountered. The investigator further researches these ideas on the internet and discovers that in one cluster, they are representative of 'ZAnon', a new cult that threatens violence on followers of both QAnon (which ZAnon considers heretical) and the 'deep state'. In the other cluster, the investigator finds no connection with a dangerous belief system or conspiracy theory; however, the novel chains of thought help the investigator to think about current events in a new and useful way.

It is therefore a primary object of the present invention to provide a method for quickly identifying fringe beliefs in text which will significantly streamline the process of analyzing and understanding the information environment.

It is another object of the present invention to provide a flexible method for identifying fringe beliefs in multilingual text which can easily be adapted to use with input data in different formats (e.g. Twitter with its 140-character limit per post, Facebook where longer posts are allowed, VKontakte in which many posts are in Russian), and specifically to eliminate hindrances for a user in reconfiguring the invention to work with different languages and formats, saving the user of the invention time in its use.

It is a further object of the present invention to provide a flexible method for identifying fringe beliefs in text which avoids intrinsic biases to the extent possible. By focusing in simply on similarities and differences in the source data, the invention plays to the advantages of unsupervised learning and avoids the need for lists of sentiment-bearing words, human assessment of what constitutes sentiment, opinion, or propaganda and how to measure these, and human intuitions and biases about what is important. The invention also avoids the cost (in labor) of compiling and maintaining such word lists and collections of human assessments and intuitions.

It is still a further object of the present invention to provide a flexible method for identifying fringe beliefs in text which can deal with unstructured text; the invention does not make any presumptions about which human language or character set (e.g. English, French, Russian) is used to encode the unstructured text.

It is still a further object of the present invention to provide a flexible method for identifying fringe beliefs in text which, after completing the analysis, supports the generation of reports showing the extent and nature of these beliefs, and in which texts they are expressed.

These and other objects of the present invention will become apparent to those skilled in this art upon reading the accompanying description, drawings, and claims set forth herein.

BRIEF DESCRIPTION OF THE DRAWINGS

Non-limiting and non-exhaustive embodiments of the invention are described with reference to the following figures.

DETAILED DESCRIPTION OF THE INVENTION

1. Definitions

Key terms used herein are defined below, and illustrated further in the Drawings.

Figure 1:
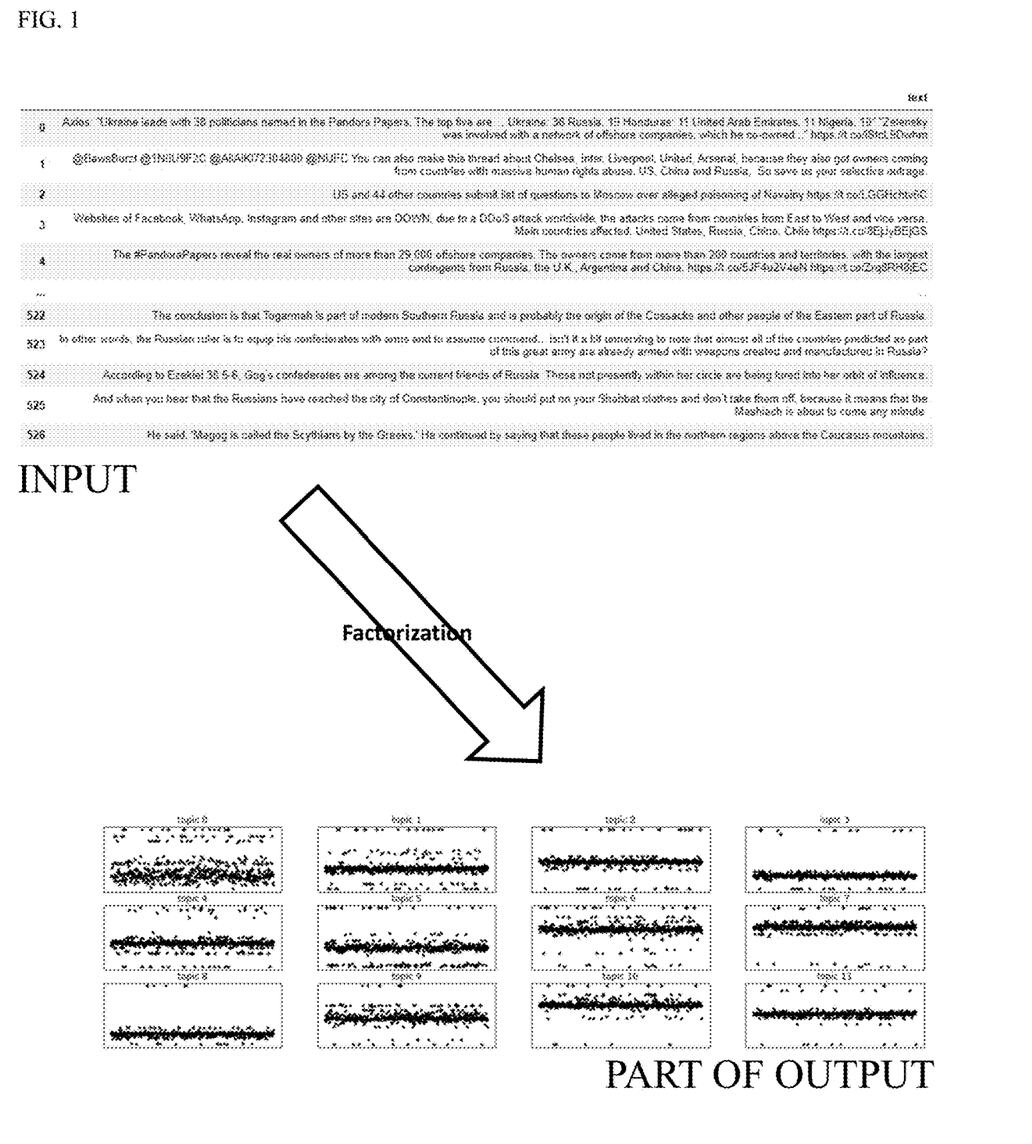
FIG. 1 shows an overview of the improved process used for identifying fringe beliefs in text.

'Dataset' as used herein shall mean an arbitrary-sized collection of documents which can be represented in electronic form. In each use of the invention, a dataset is provided by the user as input, as illustrated in FIG. 1 of the Drawings.

'Text' as used very broadly herein shall mean any text created in any language by human beings to convey meaning, and capable of being digitized, including but not limited to: collections of Twitter posts, collections of Facebook posts, collections of VKontakte (a Russian-based social media platform) posts, collections of Word documents, sentences within such documents, and collections of transcripts of speeches, or excerpts therefrom.

'Document' as used herein shall mean a single coherent chunk of text, including but not limited to: individual Twitter posts, individual Facebook posts, individual VKontakte posts, individual Word documents, sentences within such documents, and collections of transcripts of speeches, or excerpts therefrom.

'Term' as used herein shall mean an atomic piece of text, containing its own meaning, within each document. For the vast majority of human languages (including English), terms include but are not limited to individual words separated by white space or regular expressions non-word characters.

'Vector' as used herein shall have the meaning familiar to one skilled in the art of unsupervised matrix factorization as applied to text analytics (for example, Latent Semantic Analysis): a numerical representation of a term or document in the input data encoding frequencies, weighted frequencies, or other weights of terms within documents, terms within topics, or documents within topics. In Latent Semantic Analysis, each topic corresponds to one of the principal components of the singular decomposition.

'Fringe belief' or 'fringe idea' as used broadly and interchangeably herein shall mean ideas that take hold in a group of people, whether because those ideas have been deliberately propagated by a national government, ideologues, religious leaders, or other thought leaders, or simply because those ideas are of more intrinsic interest to the group of people in which the ideas take hold. Fringe ideas contrast with 'mainstream' ideas simply in that the former are held to by a small minority of people. The word 'fringe' is not intended necessarily to imply that a fringe belief is false or dangerous, though it could be. The usefulness of the present invention is simply in quickly and reliably identifying instances of fringe beliefs based solely on statistics of word usage, avoiding bias in doing so, and leaving judgments on the truth or falsehood of the fringe beliefs, and judgements and conclusions on what caused the fringe beliefs to take hold, to the human user of the invention.

2. Best Mode of the Invention

FIG. 1 shows an overview of the best mode contemplated by the inventor of the method for identifying fringe beliefs in text according to the concepts of the present invention.

3. How to Make the Invention

In one embodiment of the invention, all the steps below from the next 7 paragraphs can be set up as a Python Jupyter notebook which is easily portable to different environments and datasets, and which can quickly process large datasets. One skilled in the art will recognize that various Python libraries exist to help complete the computations required in each individual step.

Figure 2:
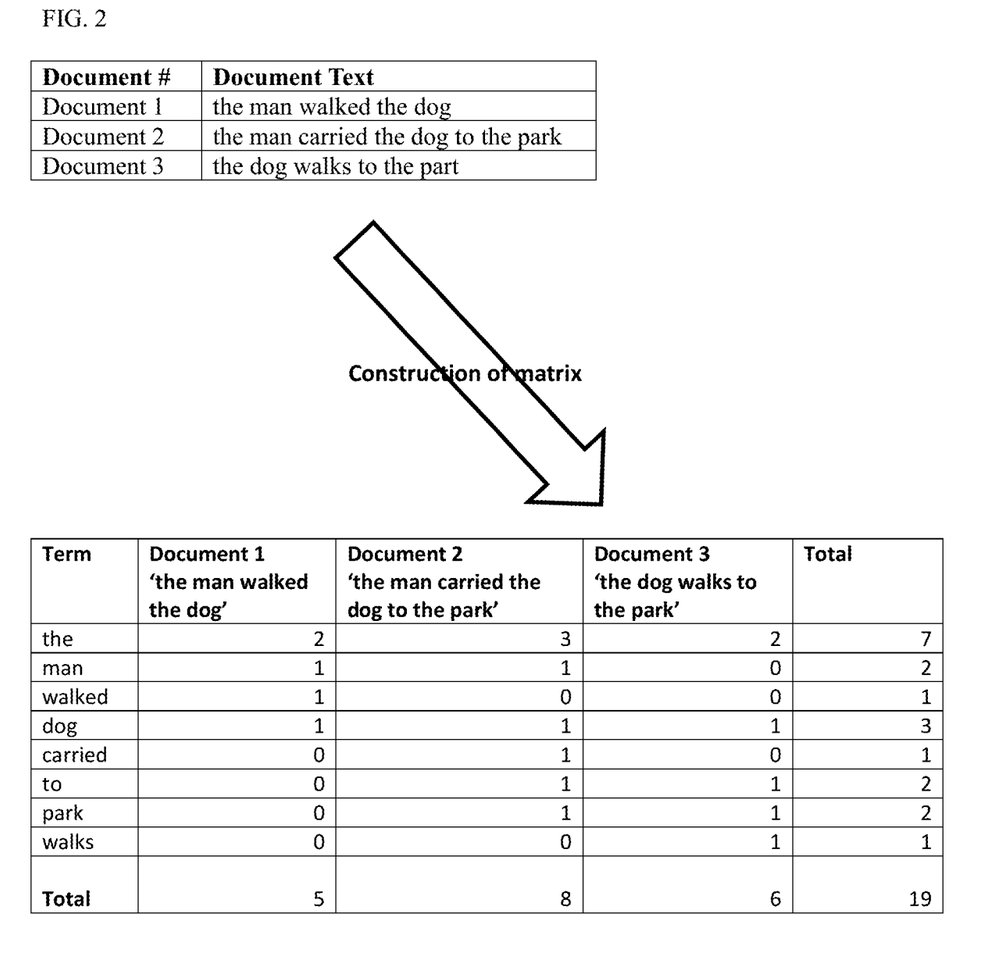
FIG. 2 shows how a term-by-document matrix is derived from text documents.

As can be amply seen from FIG. 2, the process begins by construction of a term-by-document matrix from the input dataset consisting of raw social media documents. In the input data table, each document may be in a separate row. The output matrix encodes how many times each distinct term occurs in each document.

For extraction of words from a document (consisting of unstructured text), a text tokenizer is required. An example of a preferred method for text tokenization would be the regular expressions Regex.Split method used in conjunction with "\w" (the non-word character delimiter). This method can be applied to virtually any human language encoded in any Unicode script. If the source dataset is in a Microsoft SQL Server 2005 or later database (available from Microsoft Corporation, Redmond, WA), then a highly efficient way of tokenizing text fields is to implement the regular expressions method above within a Common Language Runtime database function which can then be referenced within an SQL (Structured Query Language) database query. Within other database management systems, there are likely to be equivalent methods for text tokenization. The text tokenizer converts text within documents as shown in FIG. 2 to a format where each word within the text is a separate feature; the latter format is highly amenable to further data manipulation.

Figure 3:
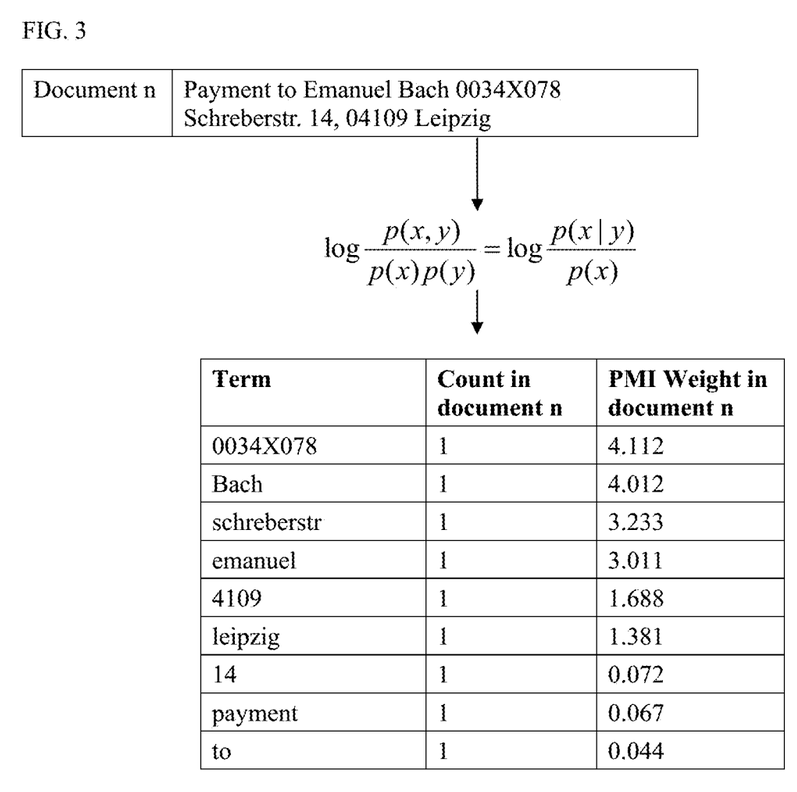
FIG. 3 shows how terms within documents may be weighted using the pointwise mutual information measure, rendering the document (in geometric terms) as a vector in multidimensional space.
Figure 4:
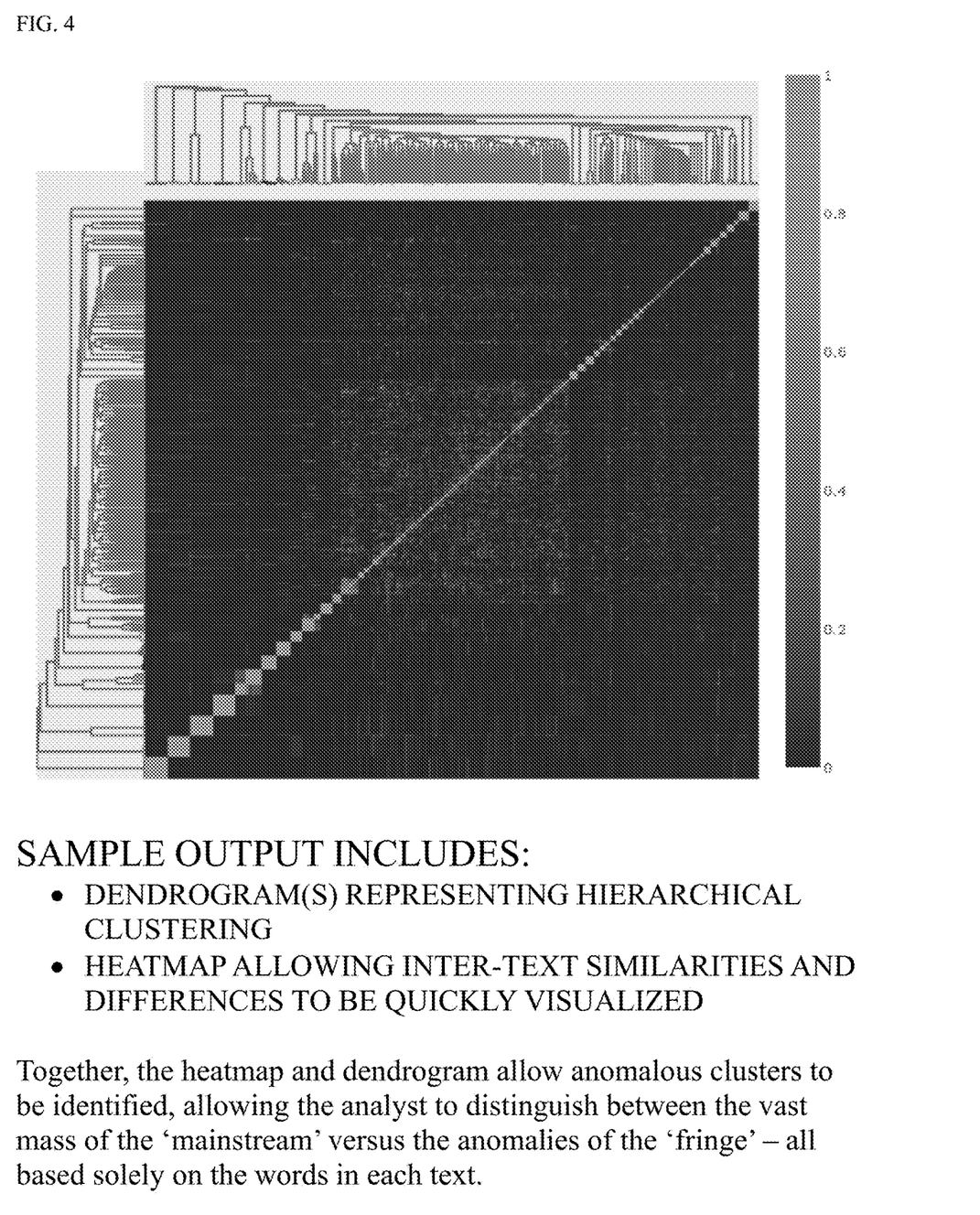
FIG. 4 shows sample output of the invention, including a combined heatmap/dendrogram graphical output in which clusters of anomalous texts are immediately visible. By reviewing this output, the user can quickly gain a sense of what texts in the source data are outliers, and which texts may be most likely to embody fringe beliefs.
Figure 5:
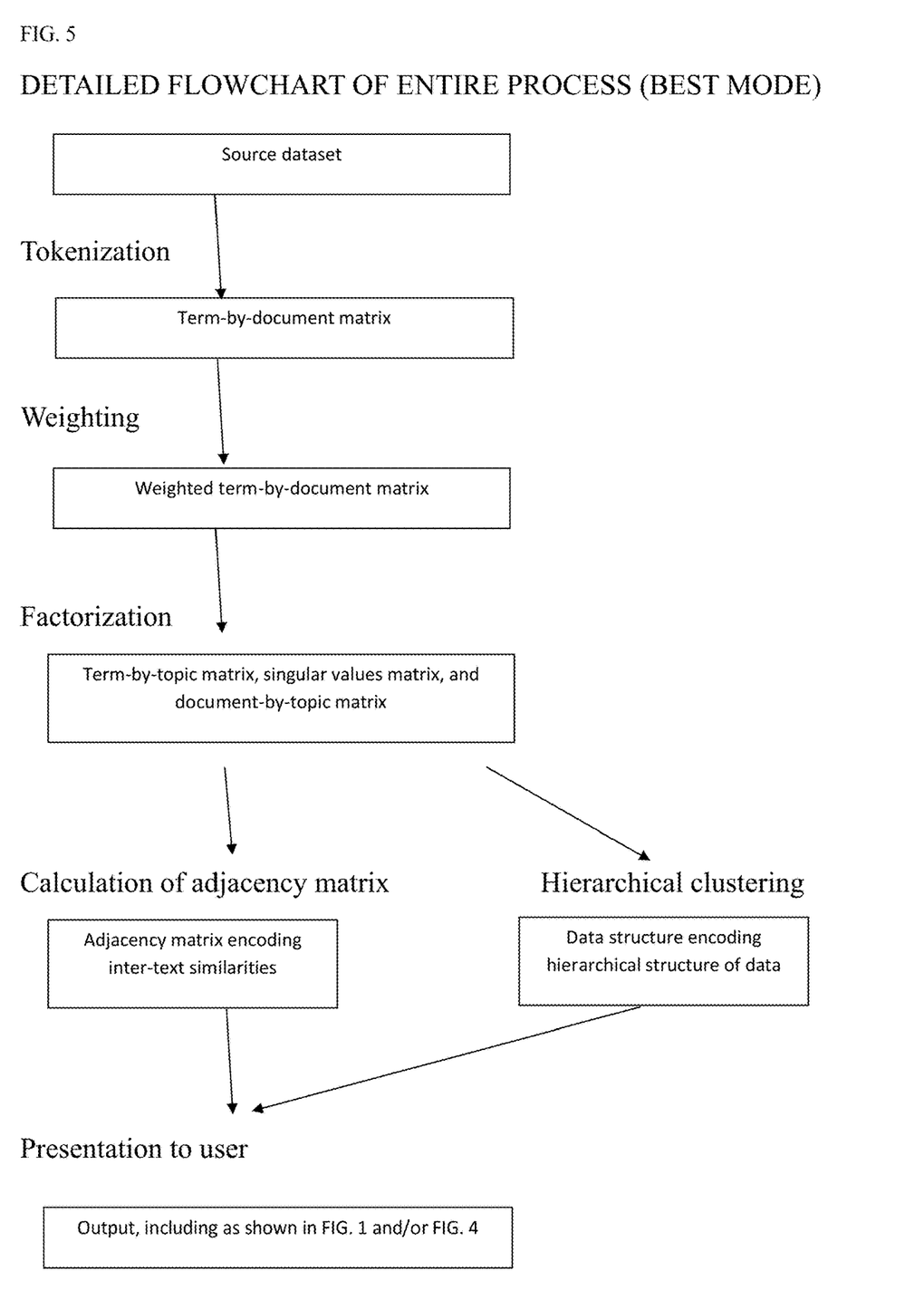
FIG. 5 shows the entire process, step by step, from input of the source dataset to output of the information that enables a user quickly to make sense of the key information in the source dataset and identify, via the graphical output, the texts most likely to embody fringe beliefs.

The method for identifying fringe beliefs in text incorporates the use of a weighting scheme to measure the distinctiveness of particular terms in particular documents. A preferred weighting scheme would be based on information theory and an example would be Pointwise Mutual Information, which can be defined as the probability of term i in (or conditional upon) document j, divided by the probability of term i occurring in the entire population. In effect, this weighting scheme calculates how much more likely a term is to occur in conjunction with a particular document than may be expected on the basis of chance. A formula for Pointwise Mutual Information is shown in FIG. 3, along with sample results of applying this weighting to terms from tokenized text. The most distinctive terms for the document are assigned higher weightings, while features which are non-distinctive are assigned lower weightings. Use of a weighting scheme in this fashion is resilient to typographical and other encoding errors in the source data, and will automatically recognize which terms are most distinguishing within a particular dataset, without any a priori knowledge of the characteristics of the dataset. This is a key reason that the present invention is highly generalizable to different datasets.

Once the terms are extracted and weighting is assigned, the method for identifying fringe beliefs in text incorporates a step to factorize the matrix obtained from the previous paragraph. In the best mode of the invention, this step is accomplished by factorizing the weighted matrix from the previous paragraph using Singular Value Decomposition (SVD). One skilled in the art of linear algebra will recognize that as output from the factorization, SVD yields three matrices: a dense term-by-topic matrix U, a diagonal singular values matrix S, and a dense topic-by-document matrix V. U is of size k by i, S of size k by k, and V of size j by k, where i is the number of distinct terms in the source dataset plus any additional terms that resulted from multi-lingualization, j is the number of documents in the source dataset, and k is the number of topics in the SVD, not greater than the smaller of i and j. k may be less than the smaller of i and j if a truncated SVD is computed. Matrix S implicitly orders the topics; the larger the singular value for a topic, the more important it is in the source dataset. Matrices U and V encode the importance of each topic to each term and document respectively.

Once factorization of the matrix is complete, an adjacency matrix is computed which encodes the similarity of every document in the original dataset to every other document in the original dataset. In the best mode of the invention, this step is accomplished by performing the matrix multiplication $(US^{-1})\cdot(US^{-1})^T$, using the output matrices from the previous paragraph.

The next step is to compute a hierarchical clustering of the documents, using the adjacency matrix as input. One skilled in the art will recognize that libraries exist to compute this clustering.

The next step is graphically to represent the adjacency matrix and a data structure representing the output of hierarchical clustering from the previous two paragraphs together, or separately, using a heatmap, a dendrogram, or both. One skilled in the art will recognize that libraries exist to render the heatmap and/or dendrogram graphical outputs. To identify and locate fringe beliefs, one skilled in the art will recognize how to read the graphical outputs to pinpoint which documents stand out as anomalies, and determine what text those documents contain. The output can quickly be reviewed by an analyst to focus his or her time most effectively on anomalies that may most warrant further explanation or investigation.

The processes explained above may constitute computer-executable instructions (e.g. software, firmware) embodied or stored within a machine-readable storage medium, that when executed by a machine will cause the machine (e.g. computer, processor, etc.) to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g. read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant arts will recognize.

4. How to Use the Invention

The method for identifying fringe beliefs in text is designed to be 'unsupervised', meaning that very little user intervention is necessary. This in turn leads to a significant savings in labor compared to existing methods. If the method is implemented as computer-executable instructions embodied or stored within a machine-readable storage medium, the user need simply specify (e.g. through a user interface) which source dataset is to be used as input, and the machine will output results allowing the user to visualize the complete input dataset and locate particular anomalous clusters of documents that merit further investigation. The user need simply review the output of the invention and use it to focus his or her attention on key aspects of the source dataset that most merit further investigation, explanation, and analysis.

The problems addressed by the method for identifying fringe beliefs in text are many as can be easily seen by those skilled in the art. The method for identifying fringe beliefs in text is not restricted to working with data in a particular format or even text in a particular human language. It is not limited in terms of the number or type of documents and terms in the source dataset. It is not limited by size of dataset, and in fact is anticipated to provide increasingly greater efficiencies and savings with larger datasets. It avoids the need for specifying heuristics particular to individual datasets. Through the connections with statistics and information theory, it can be relied upon to produce results which may even exceed the accuracy of a human, since the algorithm is able to gain a 'global' picture of similarities and subtle differences between documents, that a human could not achieve for large datasets. The present invention can dramatically reduce the amount of labor, and therefore the costs, associated with identifying fringe beliefs in text, particularly on a large scale. Since analysis of text is a function performed in many different fields, the present invention has widespread uses.

Thus it will be appreciated by those skilled in the art that the present invention is not restricted to the particular preferred embodiments described with reference to the drawings, and that variations may be made therein without departing from the scope of the present invention as defined in the appended claims and equivalents thereof.

What is claimed is:

1. A computer implemented method for identifying fringe beliefs, wherein a computer has a source dataset consisting of documents stored thereon, comprising:
   the computer tokenizing each document in the source dataset;
   the computer generating a term-by-document matrix;
   the computer factorizing the term-by-document matrix to generate a topic-by-document matrix;
   the computer calculating an adjacency matrix of similarities between each document and each other document in the source dataset;
   the computer generating output visually representing the adjacency matrix of similarities, the output enabling significant patterns and anomalies to be identified among the documents in the source dataset;
   wherein the tokenizing, generating a term-by-document matrix, factorizing the term-by-document matrix, calculating an adjacency matrix, and generating output are performed regardless of the number, type, or size of documents, regardless of the number or type of terms associated with each document, and regardless of the provenance of the dataset.

2. The computer implemented method of claim 1, wherein tokenizing documents comprises:
   using a Regex.Split regular expressions function in conjunction with a non-word delimiter \w; and
   listing all unique terms within each document and numbers of occurrences of the terms within each document.

3. The computer implemented method of claim 1, wherein generating a tert-by-document matrix comprises:
   listing unique documents along one axis of the matrix;
   listing unique terms along another axis of the matrix; and
   populating the matrix with non-zero values recording a number of times particular terms occur in conjunction with particular documents.

4. The computer implemented method of claim 1, wherein factorizing the term-by-document matrix comprises:
   performing a truncated or full singular value decomposition on the term-by-document matrix;
   generating a singular values matrix as an output of the singular value decomposition;
   generating a dense topic-by-document matrix V as an output of the singular value decomposition.

5. The computer implemented method of claim 1, wherein the generating an adjacency matrix of similarities between each document and each other document in the source dataset comprises performing a matrix multiplication using output matrices from Singular Value Decomposition.

6. The computer implemented method of claim 1, wherein generating output comprises creating a heatmap representing the adjacency matrix.

7. The computer implemented method of claim 1, wherein generating output comprises creating a dendrogram representing a hierarchical clustering of the documents.

8. The computer implemented method of claim 1, wherein generating output comprises listing topics from the factorization together with terms and documents most highly weighted in the topics.

9. An improved computer implemented method for identifying fringe beliefs, wherein a computer has a source dataset stored thereon, comprising:
    the computer tokenizing each document in the source dataset;
    the computer generating a term-by-document matrix;
    the computer applying weights to the term-by-document matrix to generate a weighted term-by-document matrix;
    the computer factorizing the weighted term-by-document matrix to generate a topic-by-document matrix;
    the computer generating an adjacency matrix of similarities between each document and each other document in the source dataset;
    the computer clustering vectors within the topic-by-document matrix to generate a data structure encoding a hierarchical clustering of the documents;
    the computer generating output visually representing the adjacency matrix of similarities, the output enabling significant patterns and anomalies to be identified among the documents in the source dataset;
    wherein the tokenizing, generating a term-by-document matrix, applying weights, factorizing, generating an adjacency matrix, clustering, and generating output are performed regardless of the number, type, or size of documents,
    regardless of the number or type of terms associated with each document, and regardless of the provenance of the dataset.

10. The improved computer implemented method of claim 9, wherein tokenizing documents comprises:
    using a Regex.Split regular expressions function in conjunction with a non-word delimiter \w; and
    listing all unique terms within each document and numbers of occurrences of the terms within each document.

11. The improved computer implemented method of claim 9, wherein generating a term-by-document matrix comprises:
    listing unique documents along one axis of the matrix;
    listing unique tens along another axis of the matrix; and
    populating the matrix with non-zero values recording a number of times particular terms occur in conjunction with particular documents.

12. The improved computer implemented method of claim 9, wherein applying weights to the term-by-document matrix comprises:
    calculating a distinctiveness weighting by measuring pointwise mutual information between respective documents and terms which occur in conjunction with one another; and
    creating a weighted term-by-document matrix identical to the term-by-document matrix except that values in the weighted term-by-document matrix are the distinctiveness weightings instead of a number of times particular terms occur in conjunction with particular documents.

13. The improved computer implemented method of claim 9, wherein factorizing the weighted term-by-document matrix comprises:
    performing a truncated or full singular value decomposition on the weighted term-by-document matrix;
    generating a singular values matrix as an output of the singular value decomposition;
    generating a dense topic-by-document matrix as an output of the singular value decomposition.

14. The improved computer implemented method of claim 9, wherein the generating an adjacency matrix of similarities between each document and each other document in the source dataset comprises performing a matrix multiplication using output matrices from Singular Value Decomposition.

15. The improved computer implemented method of claim 9, wherein generating output comprises creating a heatmap representing the adjacency matrix.

16. The improved computer implemented method of claim 9, wherein generating output comprises creating a dendrogram representing a hierarchical clustering of the documents.

17. A method for identifying fringe beliefs, comprising the steps of:
    tokenizing each document in a source dataset;
    generating a term-by-document matrix;
    applying weights to the term-by-document matrix to generate a weighted term-by-document matrix;
    factorizing the weighted term-by-document matrix to generate an ordered list of topics and a topic-by-document matrix; and
    calculating an adjacency matrix of similarities between each document and each other document in the source dataset;
    generating output visually representing the adjacency matrix of similarities, so as to transform the dataset into useful actionable information enabling identification of documents of groups of documents that merit closer scrutiny;
    wherein the tokenizing, generating a matrix, applying weights, factorizing, calculating, and generating of output are performed regardless of the number, type, or size of documents, regardless of the number or type of terms associated with each document, and regardless of the provenance of the dataset.

18. The method for identifying fringe beliefs of claim 17, further providing instructions that, when executed by a computer, will cause the computer to perform further operations, comprising:
    extracting features of each document in a dataset;
    generating a term-by-document matrix;
    applying weights to the term-by-document matrix to generate a weighted term-by-document matrix;
    factorizing the weighted term-by-document matrix;
    calculating an adjacency matrix of similarities between each document and each other document in the dataset;
    generating output enabling fringe beliefs or indicators of national interests to be identified.

* * * * *